Figure 1:
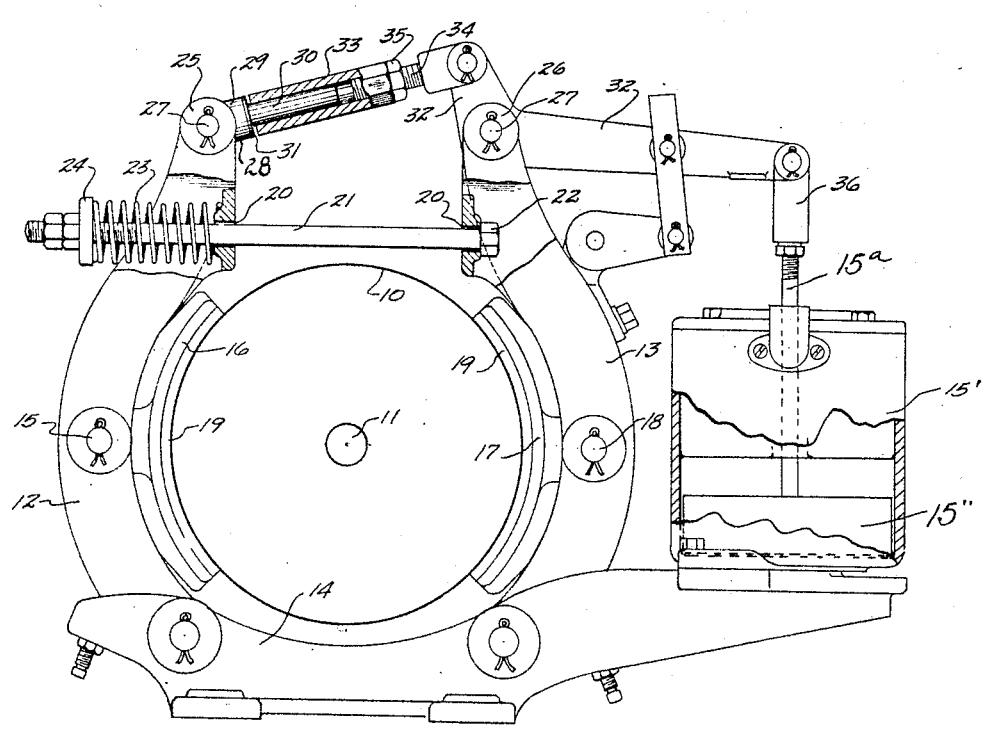

June 24, 1930.    E. C. ROSENBERG    1,767,014

BRAKE

Filed Sept. 14, 1928

INVENTOR.
Edwin Charles Rosenberg
BY
Erwin, Wheeler & Woolard
ATTORNEYS.

Patented June 24, 1930

1,767,014

UNITED STATES PATENT OFFICE

EDWIN CHARLES ROSENBERG, OF MILWAUKEE, WISCONSIN

BRAKE

Application filed September 14, 1928. Serial No. 305,899.

My invention relates to improvements in brakes.

It is the object of my invention to provide a brake which will be operative in an easy, nonjerking manner, which will have a constant pressure in application, and an effective method of release.

More particularly stated it is an object of my invention to provide a brake mechanism wherein the pressure of application will always be resilient and constant and which will be controlled for release in a positive manner.

Another object of my invention is to provide a brake operating mechanism which will provide for adjustment of the releasing means without affecting the method or strength of application of the brake.

Figure 2:
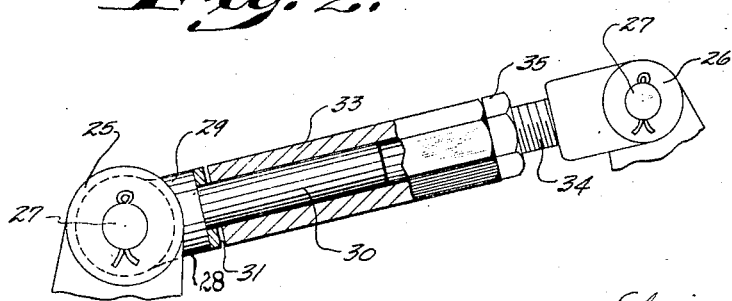

In the drawings:

1. Figure 1 is a side elevation of a brake incorporating my improved control.
2. Figure 2 is a detail of the adjustment link of my improved brake.

Like parts are identified by the same reference characters throughout the several views.

I have shown my improved brake device incorporated in a device suitable for elevator mechanisms, but it is likewise applicable to any form of brake using opposed friction surfaces.

As used in an elevator mechanism, a brake drum 10 rotatable with a shaft 11 attached to a cable drum or other rotatable part of the elevator machinery is located between two arms 12 and 13, which extend in pivotal relation from a base 14 which likewise supports an electromagnet 15' which acts upon an armature 15'' mounted upon the lower end of an armature rod 15ᵃ.

Each of the arms 12 and 13 is provided with a friction pad 16 and 17 respectively, which is pivotally mounted upon a pivot pin 18. Friction material 19 is used as a facing for each of the pads 16 and 17 and is adapted to contact with the face of the drum 10.

The arms 12 and 13 are apertured at 20 to receive a threaded bolt 21, which is headed at 22 and provided with a spring 23 retained by a washer and nuts at 24 to provide the sole source of power for the application of restraint upon the rotation of the drum 10 through the influence of the pads 16 and 17 and the friction material 19.

Each of the arms 12 and 13 has an extremity 25 and 26 respectively, apertured to receive a pin 27 to pivotally support parts of the mechanism which I provide for the release of my improved brake.

Upon the extremity 25 I have provided a stud 28, which is mounted on the pin 27 and has portions 29 and 30 providing different diameters between which a shoulder 31 is formed for a purpose hereinafter described.

Upon the pin 27 in the extremity 26 of arm 13 a bell crank 32 is pivotally mounted to support and control the reciprocation of a sleeve 33, which is slidably receivable over the small diameter 30 of the stud and is threaded to receive the fork 34. A lock nut 35 is provided upon the threads of the fork 34 to lock the sleeve 33 thereon in any position of adjustment.

At 36 an extension of the armature of the electro magnet 15' is secured to the bell crank 32 so that when the armature is drawn up by the electromagnet the bell crank will force the sleeve 33 against the shoulder 31 of the stud.

From an examination of the drawings in the light of the above description it will be seen that if the armature of the electromagnet is at rest as shown in Fig. 1 of the drawings, the armature rod 15ᵃ will, through the weight of the various parts connected therewith, draw the bell crank 32 downwardly and cause the fork 34 and the sleeve 33 to be pulled away from the stud 28 and the shoulder 31, thus permitting the spring 23 to set the brake. When the proper electrical connections through the electromagnet 15' energize the electromagnet so as to draw the armature 15'' upwardly, the armature rod 15ᵃ will force the bell crank 32 upwardly and the fork 34 and sleeve 33 will be thrust toward the arm 12 so as to close up the space between the sleeve 33 and the shoulder 31. As soon as this space is closed in the initial movement of the armature 15'' the effect of further movement of the parts connected with the armature will force the arms 12 and 13 apart and remove the friction pads 19 from contact with the drum 10.

Upon de-energization of the electromagnet 15' the weight of the armature 15" and its connections will restore the parts to the position shown in Fig. 1.

It is of importance, however, that the sleeve 33 be so adjusted on the threads of the fork 34 that there will be a slight space between the sleeve 33 and the shoulder 31 when the armature rod 15ᵃ of the electromagnet is at rest, thereby providing lost motion sufficent to allow for wear of the friction surfaces 19, and making it impossible for the sleeve to prevent application of the brake when the solenoid is at rest in brake setting position.

It will be noted that the inertia of motion of the parts 32, 33, 34, or 35 of my device in the direction of brake setting motion is not available to cause grabbing of the brake through continued motion of those parts, since the loose connection between the stud and sleeve prevents such action. At no time can the brake setting operation be enhanced beyond the expansive force of the spring 23 when the sleeve and stud separate.

I claim:

1. A brake including opposed friction surfaces, pressure means for forcing the surfaces into contact and a connection for forcing the surfaces apart, said connection in brake set position being impositively connected with said friction surfaces.

2. A brake including opposed friction surfaces supported respectively by arms, and a drum therebetween, a pressure device for constantly forcing said surfaces into contact with said drum, a stud connected to an arm supporting one of said surfaces, a fork connected to the arm supporting the other of said surfaces and positioned for interaction with the stud, whereby to separate the surfaces, said stud being loosely connected with the fork to permit of an initial movement of the fork without moving the stud.

3. In a brake mechanism: a drum, an arm provided with friction material facing the drum, a spring normally moving the friction material into contact with the drum, and a lever for forcing the friction material away from the drum, said lever being provided with a loose connection whereby an appreciable movement of the lever is required before the friction material is moved from the drum.

4. In a brake mechanism, the combination with a drum and a friction surface supported by an arm and resiliently urged against the drum, a lever for thrusting the arm from the drum and an adjustable link between the lever and the arm, said adjustable link being positively secured to the lever and impositively secured to the arm whereby adjustments of the link may be made without altering the strength of the resilient pressure of the arm toward the drum.

5. In a brake mechanism, the combination with opposed friction surfaces supported respectively by arms, a resilient pressure means interacting between the arms to constantly urge the arms toward one another, a lever mounted upon one of the arms and an adjustable link between said lever and the other of said arms, said link providing an adjustable range of movement of the lever without affecting the relative position of the arms.

EDWIN CHARLES ROSENBERG.